United States Patent [19]

Bletz et al.

[11] Patent Number: 4,541,700
[45] Date of Patent: Sep. 17, 1985

[54] METHOD AND DEVICES FOR TRANSFERRING ELECTRICAL SIGNAL INFORMATION BETWEEN A PHOTOGRAPHIC LENS AND CAMERA

[75] Inventors: Walter Bletz, Braunfels; Herbert Machmerth, Solms, both of Fed. Rep. of Germany; Walter Mandler, Midland, Canada

[73] Assignee: Ernst Leitz Wetzlar GmbH, Wetzlar, Fed. Rep. of Germany

[21] Appl. No.: 515,833

[22] Filed: Jul. 21, 1983

[30] Foreign Application Priority Data

Jul. 22, 1982 [DE] Fed. Rep. of Germany ....... 3227404

[51] Int. Cl.$^4$ ............................................. G03B 17/14
[52] U.S. Cl. .................................................... 354/286
[58] Field of Search ................ 354/455, 289.1, 289.12, 354/286

[56] References Cited

U.S. PATENT DOCUMENTS

| | | | |
|---|---|---|---|
| 4,360,255 | 11/1982 | Kawasaki | 354/286 |
| 4,382,669 | 5/1983 | Tano et al. | 354/286 |
| 4,417,798 | 11/1983 | Ohkura et al. | 354/286 |
| 4,437,752 | 3/1984 | Akashi et al. | 354/289.12 |
| 4,440,484 | 4/1984 | Komoto et al. | 354/289.12 |

*Primary Examiner*—Russell E. Adams
*Attorney, Agent, or Firm*—Schwartz, Jeffery, Schwaab, Mack, Blumenthal & Koch

[57] ABSTRACT

Active lens components are provided for transmitting to a corresponding photographic camera information from a photographic field lens which is transformed into electrical signals. These components transform the information into electrical signals, the properties of which are convertible. The signals are transmitted to an evaluating circuit in the camera either serially via a contacting device or according to a predetermined chronological sequence. The evaluation circuit is provided with means by which the original information is gained back from the signals. The signals resulting from the recovery are fed to display means and/or to control arrangements for additional camera functions. The contact for the transfer of information is also employed as a power supply contact.

16 Claims, 13 Drawing Figures

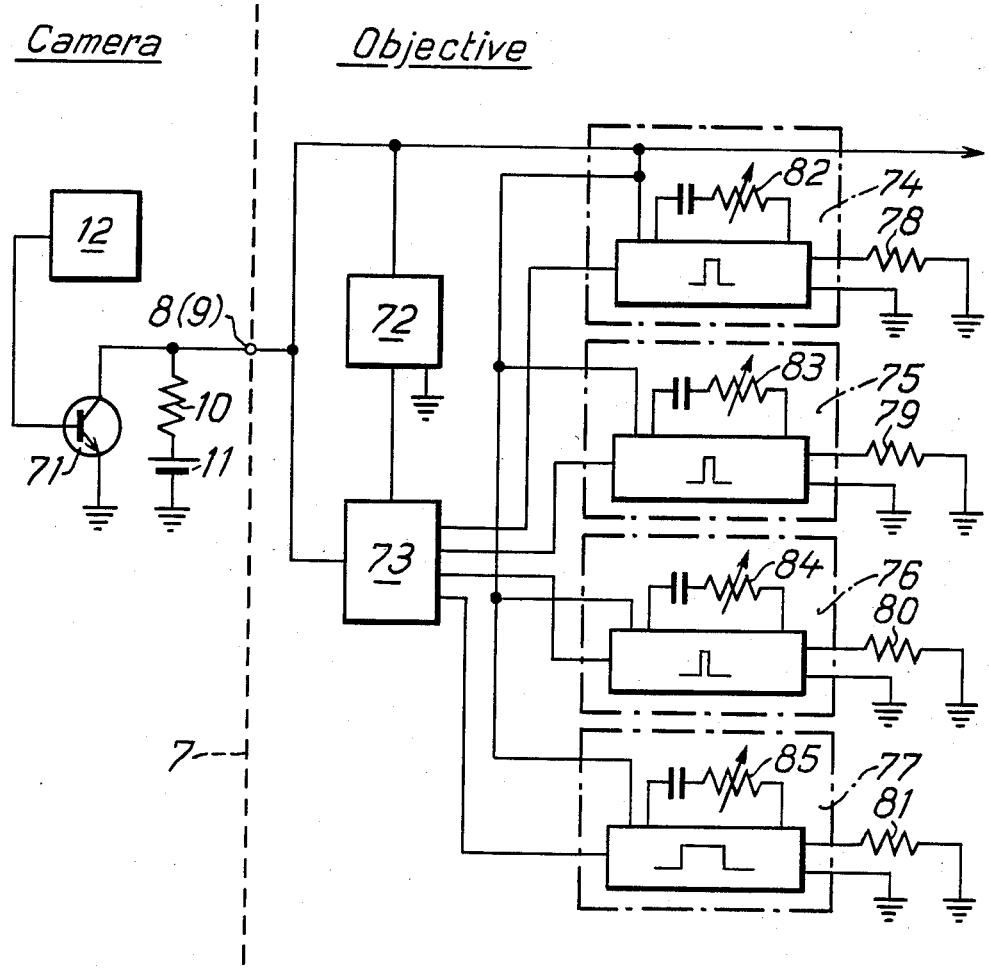

METHOD AND DEVICES FOR TRANSFERRING ELECTRICAL SIGNAL INFORMATION BETWEEN A PHOTOGRAPHIC LENS AND CAMERA

BACKGROUND OF THE INVENTION

The invention relates to a method and devices for the transfer of information from a photographic field lens to a corresponding photographic camera, wherein the information is converted into electrical signals.

A device is known in which an electrical resistance value from a mechanical-electrical converter disposed in the photographic field lens is represented corresponding to the respective diaphragm setting and is transmitted by way of several contacts corresponding to each other on the objective and on the camera into a bridge circuit provided in the camera.

According to German Offenlegungsschrift No. 2,849,932, the contacts for information input of adjustable f-numbers in this device are disposed such that a piece of information can be formed by way of a coding arrangement independent from the diaphragm setting mechanism, which information corresponds to the region of adjustable diaphragm values defined by the limiting values "largest opening" and "smallest opening".

In addition, a camera with automatic focussing is described in German Offenlegungsschrift No. 3,006,068, in which the electrical signals controlling the focussing of the interchangeable field lenses are led via corresponding signal contacts on the camera and lenses.

It is a disadvantage of the two devices that in each case only one piece of information, e.g., the opening of the aperture or the distance of the object, can be transmitted. In addition, a plurality of contacts or contact surfaces are required for the transmission of the information as well as for the power supply.

SUMMARY OF THE INVENTION

Therefore, it is an object of the present invention to provide a method in which the transmission of multiple types of information generated at the field lens to a corresponding photographic camera, as well as the power supply for the active subcomponent assemblies on the lens portion which provides the information, flow via the smallest possible number of contacts, and in the extreme case via only one single contact or contact point.

It is also an object of the present invention to provide a device for carrying out the foregoing method.

In accomplishing the foregoing objects, there has been provided in accordance with one aspect of the present invention a method for transferring different types of information from a photographic field lens of a camera to a corresponding camera body comprising the steps of converting the information from the field lens into electrical signals wherein each type of information is represented by differentiatable electrical characteristics of the signals, which characteristics are variable in accordance with the information; transmitting the field lens signals via an electrical contact to an evaluation circuit located in the camera body; producing specific electrical signals in the evaluation circuit by selection of the electrical characteristics; and using the specific electrical signals for the control and/or display of at least one camera function. Preferably, the method further comprises the step of transmitting the specific electrical signals produced in the evaluation circuit via the same electrical contact to a device in the field lens.

In accordance with another aspect of the present invention, there has been provided a method for transferring different types of information from a photographic field lens of a field lens assembly of a camera to a corresponding camera body comprising the steps of converting the information from the field lens into electrical signals by means of a conversion device in the field lens assembly; transmitting the electrical signals via an electrical contact to the camera body; and supplying the conversion device via the same contact with power from a power source located in the camera body. Preferably, this method further comprises the steps of producing specific electrical signals from the transmitted electrical signals in an evaluation circuit located in the camera body and transmitting the specific electrical signals via the same contact to the conversion device in the field lens assembly.

According to still another aspect of the present invention, there has been provided a device for transferring different types of information from a photographic field lens of a camera to a corresponding camera body, comprising:

means, located in the field lens assembly, for converting the information from the field lens into electrical signals wherein each type of information is represented by differentiatable electrical characteristics of the signals, which characteristics are variable in accordance with the information;

an evaluation circuit means, located in the camera body, for producing specific electrical signals corresponding to the particular type of information;

an electrical contact between the field lens assembly and the camera body for transmitting the field lens signals to the evaluation circuit; and means for utilizing the specific electrical signals for controlling and/or displaying at least one camera function. Preferably, the contact comprises a single contact element, and the device further comprises a power supply located in the camera body, and means for supplying power from the power supply via the contact to the converting means.

Further objects, features and advantages of the present invention will become apparent from the detailed description of preferred embodiments which follows, when considered together with the attached figures of drawing.

BRIEF DESCRIPTION OF THE DRAWINGS

In the drawings:

FIG. 12 is another circuit having active components for use on the lens side.

DETAILED DESCRIPTION OF PREFERRED EMBODIMENTS

Figure 1:
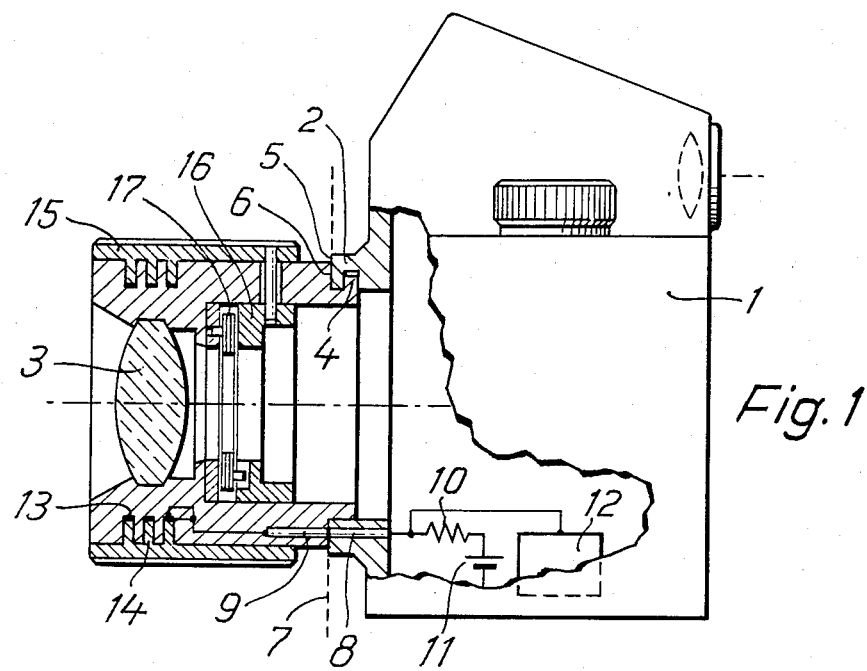
FIG. 1 is a partial cross-sectional view through a photographic camera with an interchangeable field lens and a device according to the invention.

The invention comprises a method of the kind described in the introduction wherein (a) various pieces of information from the field lens are represented by distinguishable electrical properties of the signals, which properties are correspondingly convertable to the various pieces of information, (b) the transmission of the signals is provided in series or according to a predetermined chronological sequence via a contact to an evaluating circuit disposed in the camera, (c) specific electrical signals are obtained in the evaluating circuit by selecting the property (properties) of the information (informations), and (d) these signals are used for display and/or control of corresponding camera functions and/or additional use such as, for example, storage, compensation, transmission to camera accessories.

It is a further feature of the invention that the active components located in the lens portion for providing the information are supplied with power via the same contact which is used for transmitting the signals.

The device according to the invention for performing the method is characterized in that (a) active arrangements of components are provided on the lens side which provide a conversion of the information into electrical signals having a chronological sequence, (b) a contact device is provided between the field lens and the camera body, which device transfers the electrical signals of the active arrangement of components to an evaluating circuit in the camera, (c) this evaluating circuit is provided with means for recovering the signals corresponding to the information, and that (d) means are connected following the evaluating circuit, which serve as display and/or control of corresponding camera functions and/or for further use such as, for example, storage, compensation, transfer to camera accessories.

Advantageous features and embodiments of the method according to the invention and device for carrying out this method are shown schematically in the drawings and are described in more detail below.

FIG. 1 shows schematically and partly in cross-section a housing 1 of a photographic camera having a mounting arrangement 2 for a field lens 3. The latter is fastened to the housing 1 with a conventional bayonet mounting 4. The plane in which the front face 5 of the mounting arrangement 2 and the rear face 6 of the bayonet mounting 4 contact each other is designated as 7.

A contact 8 is inserted into the front face 5 of the mounting arrangement 2 on the housing 1, and the contact 8 contacts a contact 9 disposed in the bayonet mounting 4.

The contact 8 on the camera is connected via a resistor 10 to a power supply 11 as well as to an evaluating circuit 12, such as, for example, a microprocessor.

The contact 9 on the side of the lens is connected to a variable resistor provided with current from the power supply 11 via contacts 8 and 9 as well as to a sliding contact 14. The latter is rigidly coupled to a diaphragm setting ring 15, which adjusts in iris diaphragm 17 changeable in its openings by means of a diaphragm setting element 16.

Figure 2:
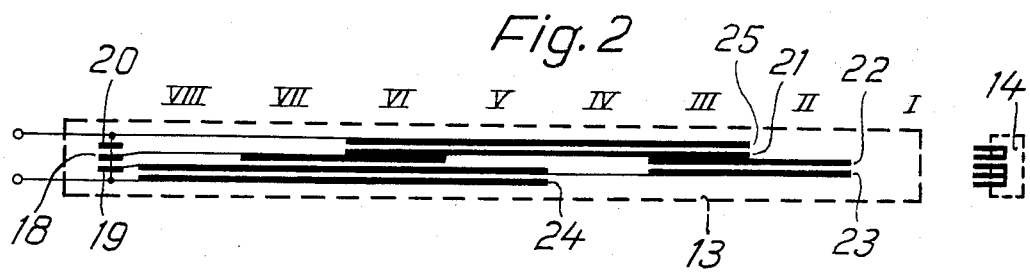
FIG. 2 is a detailed representation of a contact-providing foil provided with resistors, according to FIG. 1.

As is shown in FIG. 2, the adjustable resistor 13 can be provided as a contact-providing foil, which is attached to a fixed position part of the field lens. In this case it comprises a band-shaped flexible material and carries the resistors 18, 19 and 20 as well as the contact paths 21 to 25.

The contact paths 21 to 25 are disposed in the embodiment of FIG. 2 such that eight different resistance values corresponding to one diaphragm opening each can be tapped and can be transferred via the contacts 8 and 9 into the evaluating circuit 12 of the photographic camera 1.

If the values R18=1, R19=4 and R20=2 are assigned to the resistors 18 to 20, then the following coupling is generated at the position designated I to VIII:

| I | II | III | IV | V | VI | VII | VIII |
|---|----|-----|----|----|-----|-----|------|
| 7 | 6  | 4   | 5  | 1  | 0   | 2   | 3    |

These values, corresponding to a certain diaphragm opening, are further processed after their transfer into the evaluating circuit 12 and are displayed visibly at a display instrument not shown here.

Figure 3:
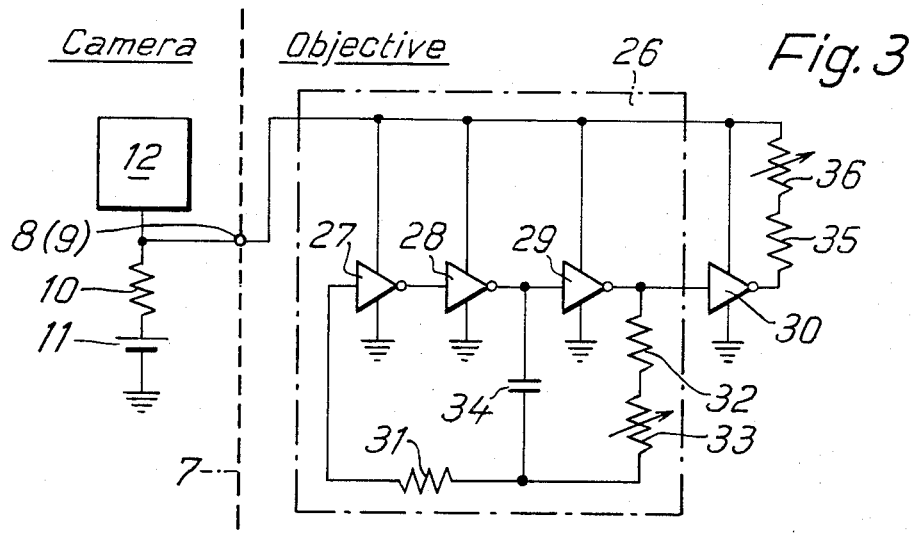
FIG. 3 is a circuit arrangement with an oscillator.

For transmitting further data collected by the lens, for example, the distance-setting, into the evaluating circuit in the housing 1 of the photographic camera, a resistance loaded oscillator 26 is provided on the lens side according to the circuit example of FIG. 3. The oscillator 26 is fed with a voltage from the power supply 11 in the camera via the contacts 8 and 9 touching each other in the plane 7 and the resistance 10. The multivibrator or oscillator 26 comprises successively connected gates 27 to 30, of which the gates 27 to 30 together with the resistors 31 to 33 as well as a capacitance 34 form a multivibrator, the frequency of which can be adjusted by way of the resistor 33. The frequency present at its output is transmitted via the gate 30 as well as a resistor 35 and a controllable resistor 36 to the contacts 8, 9, from where it passes to the evaluating circuit 12.

Figure 4:
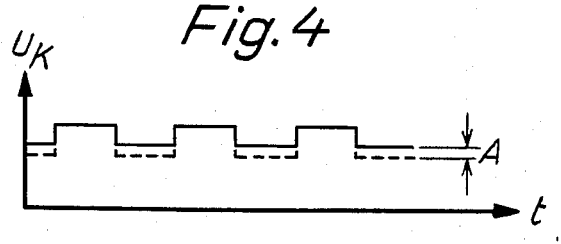
FIGS. 4 and 5 are voltage diagrams, which can be generated with the circuit arrangement of FIG. 3.
Figure 5:
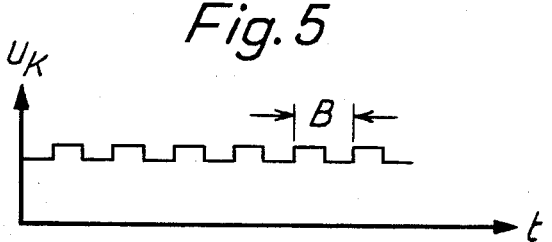

Both the static lens data (lens identification), such as the focal length, the relative opening etc., as well as the dynamic lens data, such as, for example, the changing aperture, the distance setting, can be represented electrically and transmitted. In the first instance, as is shown in the voltage diagram of FIG. 4, the amplitude A of the signal at the contacts 8 and 9 is changed according to the static information to be transmitted. A change in the frequencey B (or also of the time) is provided in the second case, as is shown in FIG. 5.

The evaluation of electrical signal values obtained in this manner is performed in the evaluation circuit 12 in the camera, for example, by way of a low pass filter not shown here, the output voltage of which represents an analog measure coordinated to certain lens data, for example, the aperture or also of static lens data.

The signal frequency is called upon for the determination of dynamic lens data such as, for example, the distance setting, using the same signal and the same contact. This is shown in FIG. 5. The evaluation circuit 12 in the camera can contain a circuit according to FIG. 6 for differentiation of the signal. This comprises a capacitor 37 following the contacts 8 and 9, a protective resistor 38, a diode 39, a monostable multivibrator 40 as well as a low pass filter comprised of capacitor 41 and resistor 42.

The signal at the contacts 8 and 9 passes via the capacitor 37 and the protective resistor 38 to the diode 39, through which the negative signal pulse is shorted. The monostable multivibrator 40 following the diode 39 serves as a pulse shaper. The voltage present at the output of the monostable multivibrator 40 is transformed into an analog signal by the low pass filter comprising capacitor 41 and resistor 42 and is fed to a display instrument (not shown) and/or to a member-controlling respective camera functions.

Figure 7:
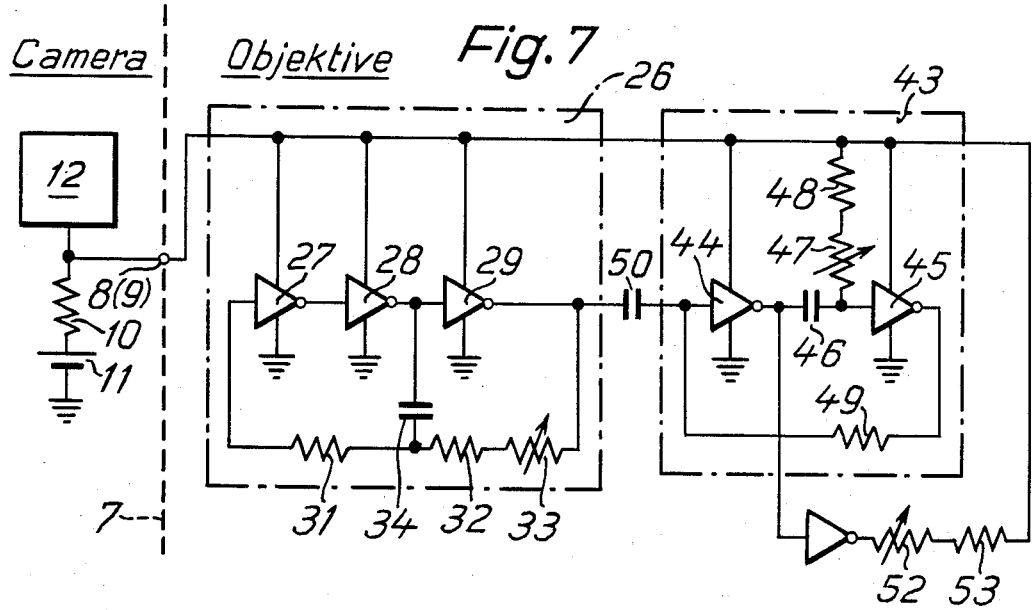
FIGS. 7 and 7a are circuit arrangements on the lens for transmitting different data via a common contact.

The circuit example of FIG. 7 shows how various data can be transmitted via the insulated contacts 8 and 9. In addition, a monostable multivibrator 43 follows the oscillator 26 shown in FIG. 3. The monostable multivibrator 43 comprises gates 44 and 45, between which is disposed a capacitor 46, a potentiometer 47 as well as a further resistor 48 disposed ahead of the potentiometer 47. A further resistor 49 is connected between the input of the gate 44 and the output of the gate 45 for providing coupling. A capacitor 50 is inserted between the oscillator 26 and the monostable multivibrator 43, and the monostable multivibrator 43 forms a signal shaping stage with the capacitor 50.

The distance set at the field lens 3 and the lens identification are converted into corresponding electrical signals by means of the resistive load of the resistors 52 and 53 as well as by the resistors 32 and 33 changing the frequency. The electrical signals are fed to the evaluation circuit 12 in the camera via the contacts 8 and 9.

The dynamic (changing) aperture value of the lens can be converted into an electrical parameter with a specific characterizing value by means of the variable resistor 47, which influences the discharge time of the monostable multivibrator 43 and thus the pulse duty cycle. The electrical parameter is also transferred to the evaluation circuit 12 in the camera by way of contacts 8 and 9.

Figure 6:
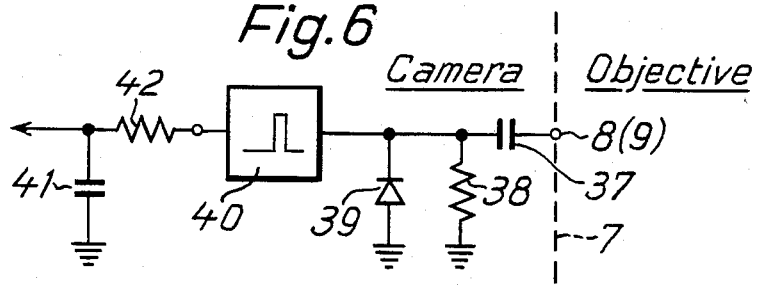
FIG. 6 is a diagram of the embodiment of a circuit portion for evaluating the signal frequency.

On the camera side, the distance setting is represented by the voltage applied to contact 8 and resulting from a low pass filter comprising capacitor 41 and resistor 42 according to FIG. 6.

The lens identification can also be converted into an electrical signal by means of a circuit arrangement corresponding to that of FIG. 6.

Figure 7A:
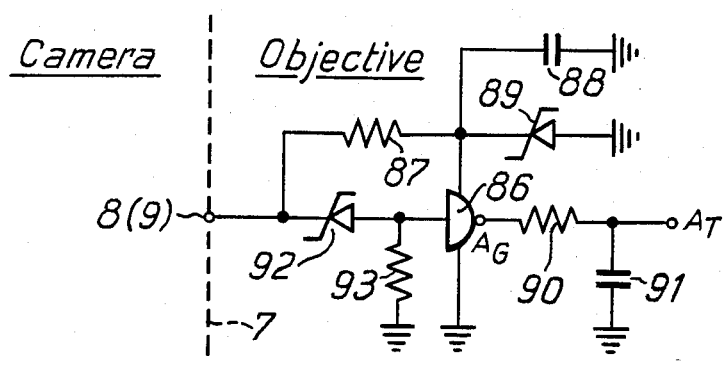

The electrical signal for the set aperture value or for the changing aperture is obtained by means of a circuit according to FIG. 7a. For this purpose, a gate 86 as for instance the MM74C04-type gate described in the CMOS Data Book 1981 of the National Semiconductor Corporation discharges a voltage stabilized by a resistor 87, a capacitor 88 and a Zener diode 89. The pulse duty cycle with a constant voltage arriving at the output $A_G$ is converted into an analog voltage via an RC circuit member 90, 91. A Zener diode 92 connected ahead of the gate 86 together with a resistor 93 shift the input potential in order to bring the gate 86 into the switching region.

Figure 8:
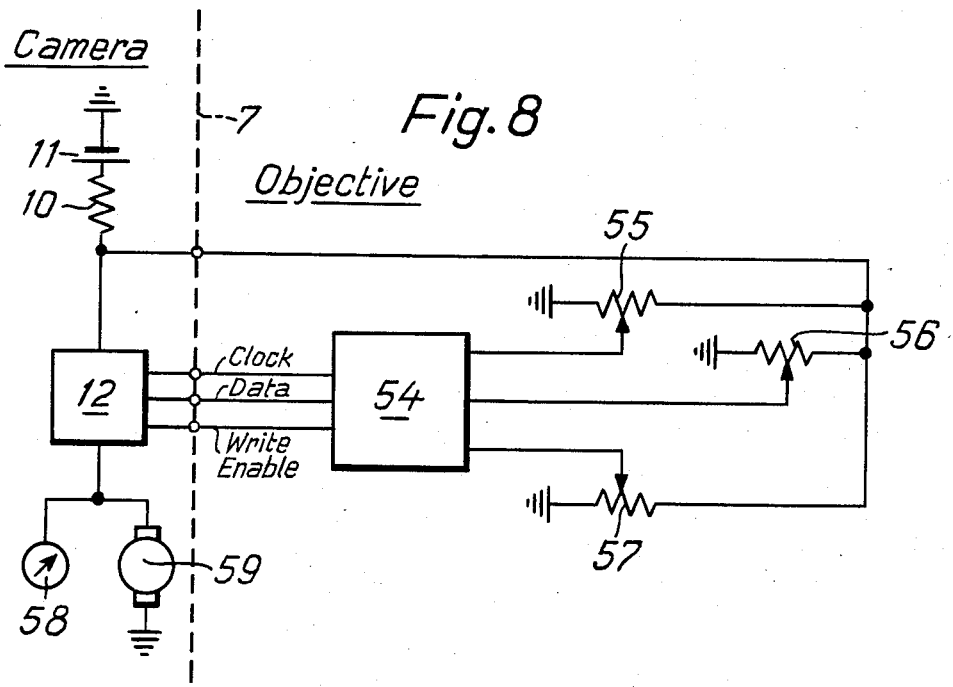
FIG. 8 is a diagram of a data transmission device having an output electronic circuit on the lens side.

The embodiment of FIG. 8 comprises an electronic output circuit 54 such as, for example, a microprocessor on the lens side. The output circuit 54 receives the data which is provided by the lens and is converted into electrical values by the potentiometers 55 to 57 such as, for example, the distance setting, aperture and identification. This output circuit 54 comprises (depending on the control point input) an analog-to-digital converter or a decoder as well as a multiplexer, which are not illustrated here, such that digital information is available at its output for transmission to the evaluation circuit in the camera. The signals processed there are fed to a display device 58 and/or a drive device 59 following the evaluation circuit 12, and the drive device 59 serves for control of further camera functions.

Figure 9:
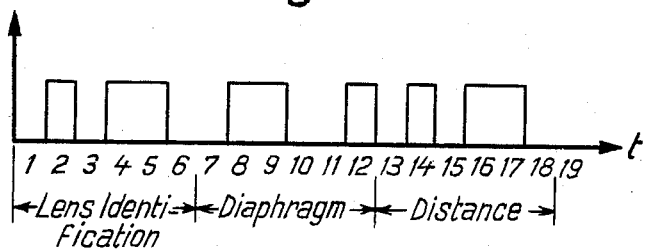
FIG. 9 is a voltage diagram referring to a serial data transmission.

The electronic output circuit 54 obtains its voltage from the power supply 11 in the camera, according to the embodiment shown in FIG. 8. In addition, a "clock" pulse generated by the evaluation circuit 12 can be fed to the electronic output circuit 54. A "write-enable" signal provided by the evaluation circuit 12 is fed to the output circuit 54 before releasing of the camera shutter, whereupon the electrical values, generated by the potentiometers 55 to 57 and picked up by the electronic output circuit 54, for the aperture, the distance setting control, and others, and are serially transferred into the evaluation circuit 12. One or several data conductors are provided for the transmission. If one proceeds from the assumption that the data from the lens are stored in the electronic output circuit 54 in each case as a 6-bit information, then first the lens identification, then the aperture, and finally the distance setting can be transmitted as electrical values into the output circuit 12, as is shown in the voltage diagram of FIG. 9.

However, it is also possible to transmit further data by additional "bits" or distinguishable information by differing "bits".

The "write-enable" signal reverts again to the output potential after termination of the serial data transmission.

It is conceivable as an alternative, that the field lens 3 is provided with its own voltage source and that a quartz crystal is coordinated to the electronic output circuit 54 on the lens side for generation of the "clock" pulse.

The data transmission between the field lens 3 and the evaluation circuit 12 in the housing 1 of the camera with only one contact 8, 9, respectively, is possible by furnishing both the evaluation circuit 12 in the camera as well as the electronic output circuit 54 on the lens side with in each case one I/O port known from the microprocessor literature, i.e., the same pin can serve both as an input as well as an output.

Figure 10:
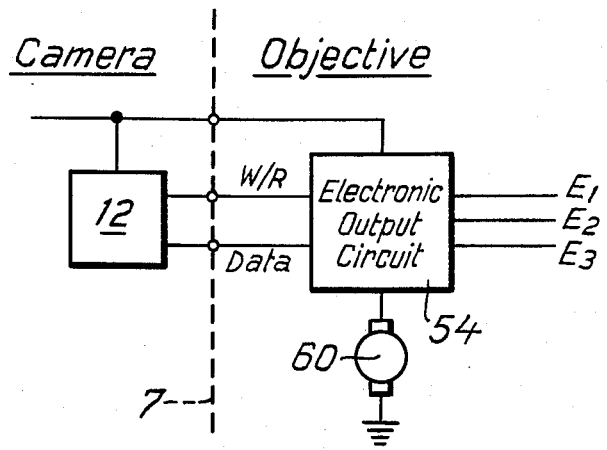
FIG. 10 is a circuit arrangement for the additional control of a motor setting the distance.

According to the embodiment of FIG. 10, a servomotor 60, such as, for example, used for the distance setting control, is directly connected to the electronic output circuit 54 in the lens. The latter transmits the lens information to the evaluation circuit 12 in the camera, which evaluation circuit 12 in turn feeds the control signals to the servomotor 60 via the output circuit 54. According to the embodiment, it is provided that the servomotor 60 is controlled via a digital-to-analog converter (not shown here) integrated into the output circuit. Also conceivable is a digital adjustment setting, including a step motor. In this case, the pieces of information are running via a data conduit. The line designated W/R illustrated in FIG. 10 indicates if the output circuit 54 emits or receives information.

Figure 11:
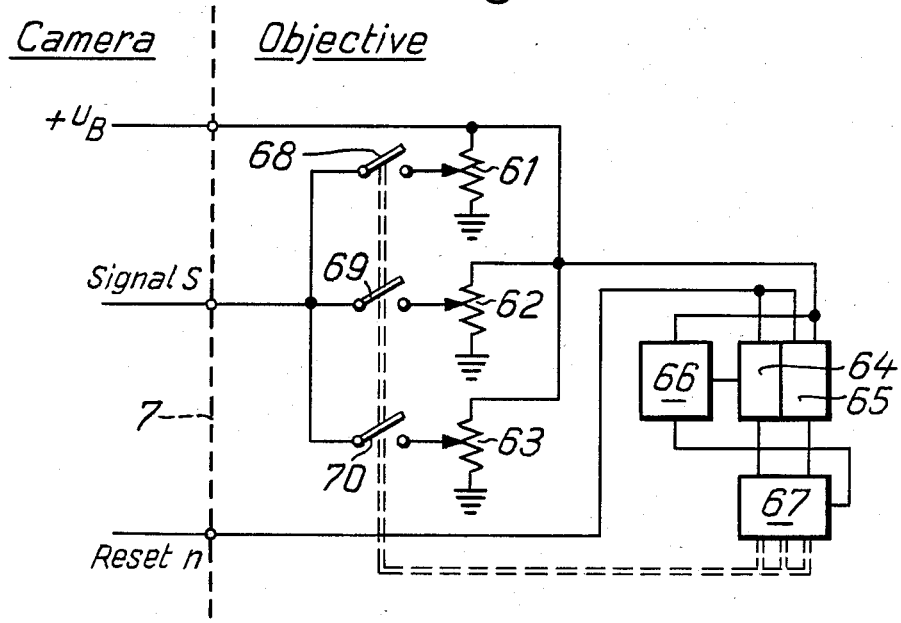
FIG. 11 is an example of a circuit for multiplex transmission of data from the lens converted into analog values.

A further variant for the transmission of lens data is illustrated in FIG. 11. Here electrical values generated by the potentiometers 61 to 63 and, for example, corresponding to the distance setting, the aperture, and the lens identification, are transmitted as analog values by the multiplex method into the evaluating circuit in the camera. If the counters 64, 65 receive a return signal via the line "n", then the generator 66 provides three pulses to the counters 64, 65. Thereby a decoder circuit 67 following the counters 64, 65 generates an L-signal successively at its three outputs. The L-signal is similar to the signal generated by the CD4066BM type circuit particularly described in the CMOS Data Book 1981 of the National Semiconductor Corporation. The switches 68 to 70 are successively closed upon occurrence of the L-signal. The fourth output of the decoder circuit 67 blocks the generator 66 up to the appearance of the next reset pulse.

Semiconductor switches are preferred as switches. However, also mechanical switches can be employed, which are actuated by a cam driven by a focus adjustment motor 60.

At the beginning of the scanning, the voltage at the contact 8, 9 is set to "0" by means of a transistor 71 in connection with the circuit variant on the lens side with active components illustrated in FIG. 12. Upon increasing of the voltage at the contact 8, 9, a generator 72 is put in operation, which then provides four pulses to a counter 73 coupled to a decoder. The pulses are successively fed further to monostable multivibrators 74 to 77. These are successively activated and load the contact 8, 9 via the resistors 78 to 81. The length of the signal pulses generated by the monostable multivibrators 74 to 77 are influenced by these integrated variable resistors 82 to 85. The pulses are fed to the evaluation circuit 12 in the camera via contacts 8, 9, where their length and amplitude are evaluated.

What is claimed is:

1. A method for transferring different types of information converted into electrical field lens signals from a photographic field lens of a camera to a corresponding camera body comprising the steps of:
   (a) representing each type of said information by differentiatable electrical characteristics of the field lens signals, which characteristics are variable in accordance with the information;
   (b) transmitting in one of a predetermined chronological order and series order the field lens signals via a same electrical contact to an evaluation circuit located in the camera body;
   (c) producing specific electrical signals in the evaluation circuit by selection of said electrical characteristics; and
   (d) using the specific electrical signals for at least one of the control and display of at least one camera function.

2. A method according to claim 1, further comprising the step of transmitting via said same contact electrical signals other than said specific electrical signals produced in the evaluation circuit to a device in the field lens.

3. A method according to claim 1, wherein said transmitting step comprises digital transmitting.

4. A method according to claim 1, wherein said transmitting step comprises analog transmitting.

5. A method according to claim 1, wherein said transmitting step comprises a coded transmitting.

6. A method for transferring different types of information converted into electrical field lens signals from a photographic field lens of a field lens assembly of a camera to a corresponding camera body comprising the steps of:
   (a) transmitting in one of series or predetermined chronological order the electrical signals via a contact to the camera body; and
   (b) supplying the conversion device of said photographic field lens with power via said contact from a power source located in the camera body.

7. A method according to claim 6, wherein said transmitting step comprises digital transmitting.

8. A method according to claim 6, wherein said transmitting step comprises analog transmitting.

9. A method according to claim 6, wherein said transmitting step comprises a coded transmitting.

10. A method according to claim 6, further comprising the steps of producing in an evaluation circuit located in the camera body specific electrical signals different from said transmitted electrical signals and transmitting the specific electrical signals via said contact to the conversion device in the field lens assembly.

11. A device for transferring different types of information converted into electrical field lens signals from a photographic field lens of a camera to a corresponding camera body, comprising:
   means, located in the field lens assembly, for representing each type of information by differentiatable electrical characteristics of the field lens signals, which characteristics are variable in accordance with the information;
   an evaluation circuit means, located in the camera body, for producing specific electrical signals corresponding to the particular, type of information;
   a contact device between the field lens assembly and the camera body for transmitting in one of a serial or chronologically predetermined order said field lens signals to said evaluation circuit; and
   means for utilizing said specific electrical signals for at least one of controlling and displaying at least one camera function.

12. A device according to claim 11, wherein said contact device consists of a single contact element.

13. A device according to claim 11, further comprising a power supply located in the camera body, and means for supplying power from said power supply via said contact devices to said converting means.

14. A device according to claim 11, wherein said evaluation circuit comprises a microprocessor.

15. A device according to claim 11, wherein said converting means comprises an oscillator for producing pulse signals indicative of said information.

16. A device according to claim 11, wherein said converting means comprises means for multiplexing said field lens signals transmitted over a single contact to said evaluation circuit means.

* * * * *